US012616958B2

(12) United States Patent
Jeon et al.

(10) Patent No.: US 12,616,958 B2
(45) Date of Patent: May 5, 2026

(54) MICRO-SEPARATOR INCLUDING 3D ORDERED NANOSHELL STRUCTURE OF CERAMIC-POLYMER COMPOSITE FOR GAS CHROMATOGRAPHY, METHOD FOR FABRICATING THE SAME AND METHOD FOR SEPARATING GAS MIXTURE USING THE SAME

(71) Applicant: Korea Advanced Institute of Science and Technology, Daejeon (KR)

(72) Inventors: Seokwoo Jeon, Daejeon (KR); Kisun Kim, Daejeon (KR); Caiyan Qin, Daejeon (KR); Yongseong Cha, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 739 days.

(21) Appl. No.: 18/003,522

(22) PCT Filed: Jul. 8, 2022

(86) PCT No.: PCT/KR2022/009944
§ 371 (c)(1),
(2) Date: Dec. 28, 2022

(87) PCT Pub. No.: WO2023/027331
PCT Pub. Date: Mar. 2, 2023

(65) Prior Publication Data
US 2024/0100505 A1 Mar. 28, 2024

(30) Foreign Application Priority Data

Aug. 23, 2021 (KR) ........................ 10-2021-0110618
May 17, 2022 (KR) ........................ 10-2022-0060359

(51) Int. Cl.
*B01D 53/02* (2006.01)
*B01J 20/285* (2006.01)
(Continued)

(52) U.S. Cl.
CPC ......... *B01J 20/285* (2013.01); *B01J 20/3085* (2013.01); *B01J 20/3291* (2013.01);
(Continued)

(58) Field of Classification Search
CPC ... B01D 53/02; B01J 20/28004; B01J 20/282; B01J 20/285; B01J 20/3057;
(Continued)

(56) References Cited

U.S. PATENT DOCUMENTS 7,704,684 B2 4/2010 Rogers et al.
2007/0084346 A1* 4/2007 Boyle ................... B01J 20/205
428/411.1
(Continued)

FOREIGN PATENT DOCUMENTS

JP 2003-517591 A 5/2003
KR 10-2011-0058498 A 6/2011
(Continued)

OTHER PUBLICATIONS

Haudebourg et al., "Temperature-Programmed Sputtered Micromachined Gas Chromatography Columns: An Approach to Fast Separations in Oilfield Applications;" Article from *Analytical Chemistry*; Published Nov. 20, 2012; 7 Pages.
(Continued)

*Primary Examiner* — Christopher P Jones
(74) *Attorney, Agent, or Firm* — DALY, CROWLEY, MOFFORD & DURKEE, LLP

(57) ABSTRACT

A micro-separator for gas chromatography includes a base substrate having a trench defining a micro-column, and a three-dimensional (3D) porous ceramic-polymer composite
(Continued)

disposed in the micro-column and having pores that three-dimensionally connected to each other with periodicity. The 3D porous ceramic-polymer composite includes a ceramic nano-structure, which forms an array of three-dimensionally arranged nano-shells, and a reaction-activating layer combined on a surface of the ceramic nano-structure and including a polymeric reaction-activating material. A thickness of the 3D porous ceramic-polymer composite is 10 μm to 20 μm, a column length of the 3D porous ceramic-polymer composite is 30 cm to 70 cm, and a shell thickness of the ceramic nano-structure is 20 nm to 60 nm. The micro-separator may have improved separation performance and durability.

10 Claims, 10 Drawing Sheets

(51) Int. Cl.

| | | |
|---|---|---|
| *B01J 20/30* | (2006.01) | |
| *B01J 20/32* | (2006.01) | |
| *G01N 30/60* | (2006.01) | |
| *B82Y 15/00* | (2011.01) | |
| *B82Y 40/00* | (2011.01) | |
| *G01N 30/02* | (2006.01) | |

(52) U.S. Cl.
  CPC ....... *G01N 30/6095* (2013.01); *B01J 2220/46* (2013.01); *B01J 2220/54* (2013.01); *B82Y 15/00* (2013.01); *B82Y 40/00* (2013.01); *G01N 2030/025* (2013.01)

(58) Field of Classification Search
  CPC ................ B01J 20/3085; B01J 20/3291; B01J 2220/46; B01J 2220/54; B82Y 15/00; B82Y 40/00; G01N 2030/025; G01N 30/6095
  See application file for complete search history.

(56) References Cited

U.S. PATENT DOCUMENTS

| 2009/0320991 A1* | 12/2009 | Boyle | ............... B01J 20/28007 |
|---|---|---|---|
| | | | 977/891 |
| 2014/0322518 A1 | 10/2014 | Addleman et al. | |
| 2018/0237927 A1 | 8/2018 | Liao et al. | |
| 2018/0292364 A1* | 10/2018 | Suslick | ................. B01J 20/285 |
| 2022/0074899 A1* | 3/2022 | Jeon | ...................... G01N 30/52 |
| 2024/0100505 A1* | 3/2024 | Jeon | ...................... B01J 20/285 |

FOREIGN PATENT DOCUMENTS

| KR | 10-2012-0021647 | A | 3/2012 |
|---|---|---|---|
| KR | 10-1401342 | B1 | 5/2014 |
| KR | 10-1404041 | B1 | 6/2014 |
| KR | 10-1699454 | B1 | 1/2017 |
| KR | 10-2019-0118033 | A | 10/2019 |
| KR | 10-2112029 | B1 | 5/2020 |
| KR | 10-2020-0116739 | A | 10/2020 |
| KR | 10-2183456 | B1 | 11/2020 |

OTHER PUBLICATIONS

Jeon et al., "Fabricating Complex Three-Dimensional Nanostructures with High-Resolution Conformable Phase Masks;" Proceedings of the National Academy of Sciences (PNAS), vol. 101, No. 34; Aug. 24, 2004; 6 Pages.
Saito et al., "Polymer-Coated Fibrous Materials as the Stationary Phase in Packed Capillary Gas Chromatography;" Article from *Analytical Chemistry*, vol. 75, No. 20; Oct. 15, 2003; pp. 5525-5531; 7 Pages.
Siritham et al., "A Preconcentrator-Separator Two-in-One Online System for Polycyclic Aromatic Hydrocarbons Analysis;" Article from *Talanta*; Accepted Feb. 17, 2017; 10 Pages.
Vial et al., "Silica Sputtering as a Novel Collective Stationary Phase Deposition for Microelectromechanical System Gas Chromatography Column: Feasibility and First Separations;" Article from *Journal of Chromatography A*; Available Online Dec. 21, 2010; 5 Pages.
Yang et al., "Review on Stationary Phases and Coating Methods of MEMs Gas Chromatography Columns;" Review Article from *Reviews in Analytical Chemistry*; Accepted Aug. 27, 2020; pp. 247-259; 13 Pages.

* cited by examiner

[FIG. 1a]
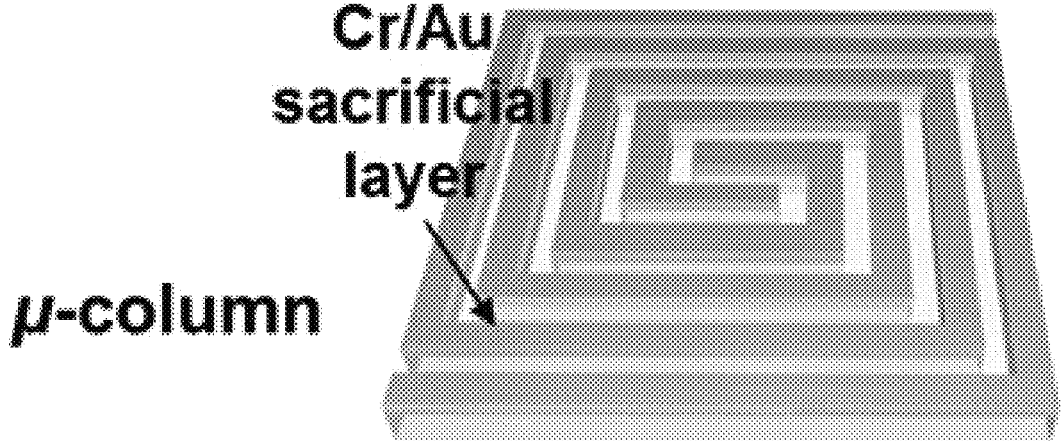
[FIG. 1b]
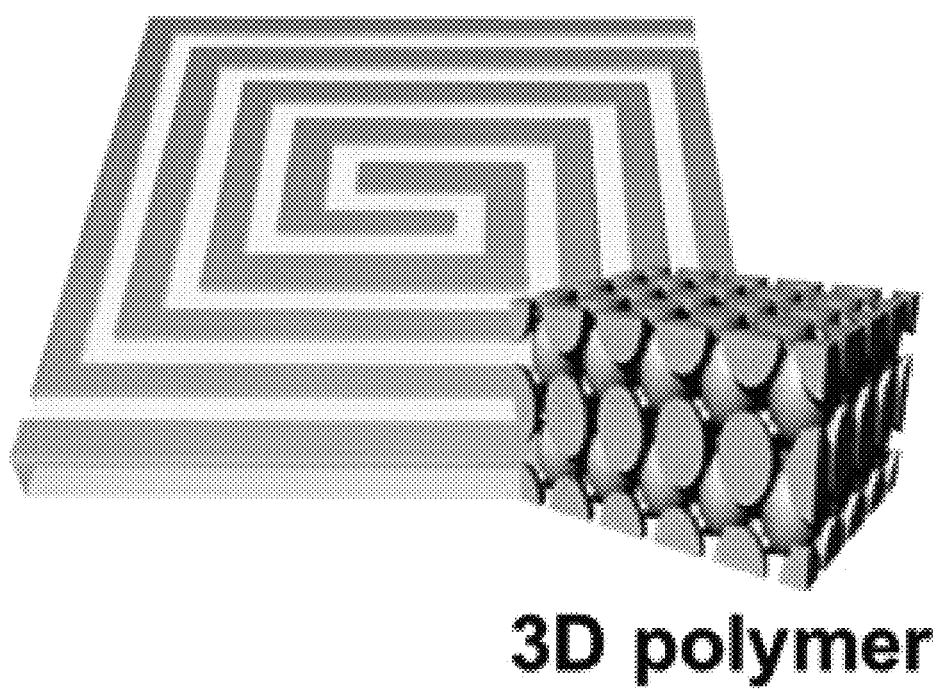

[FIG. 1c]
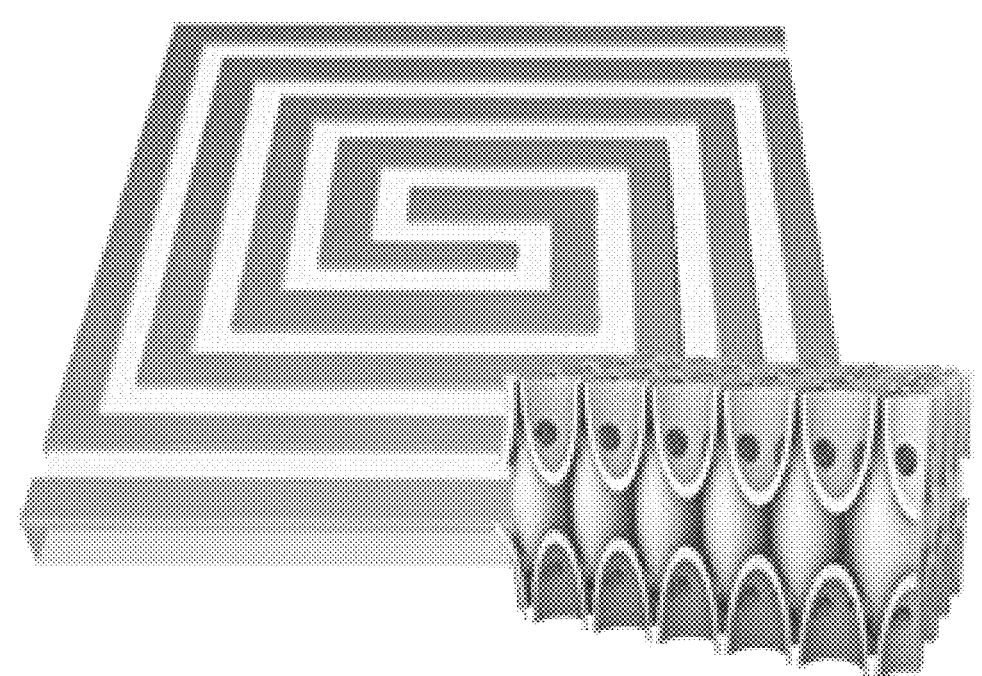
3D metal oxide shell
[FIG. 1d]
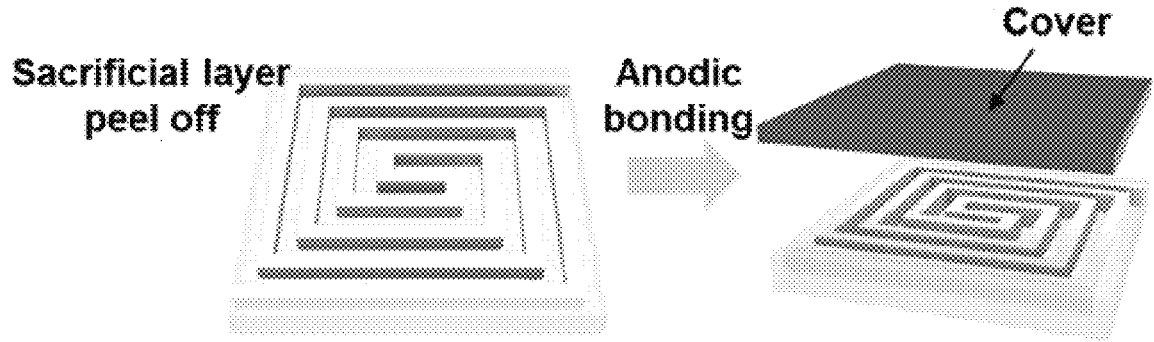

[FIG. 1e]
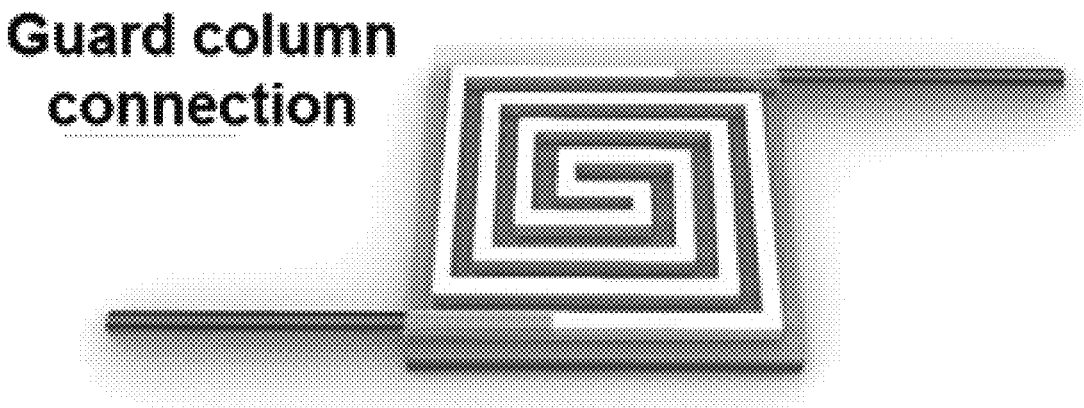
[FIG. 2a]
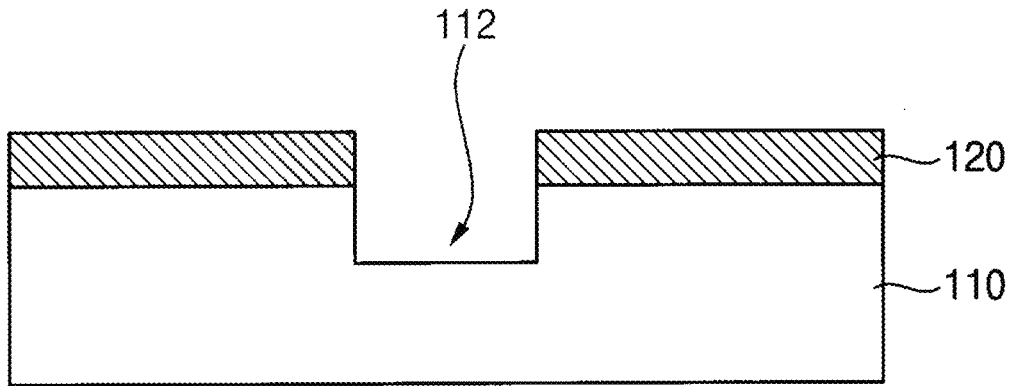

[FIG. 2b]
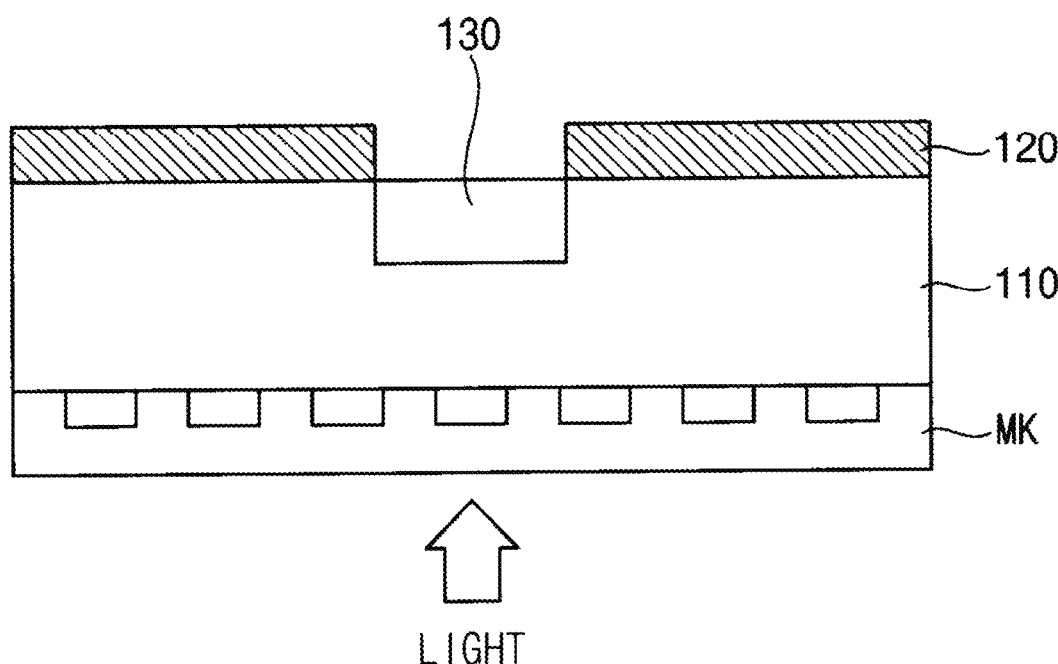
LIGHT
[FIG. 2c]
DEVELOPER
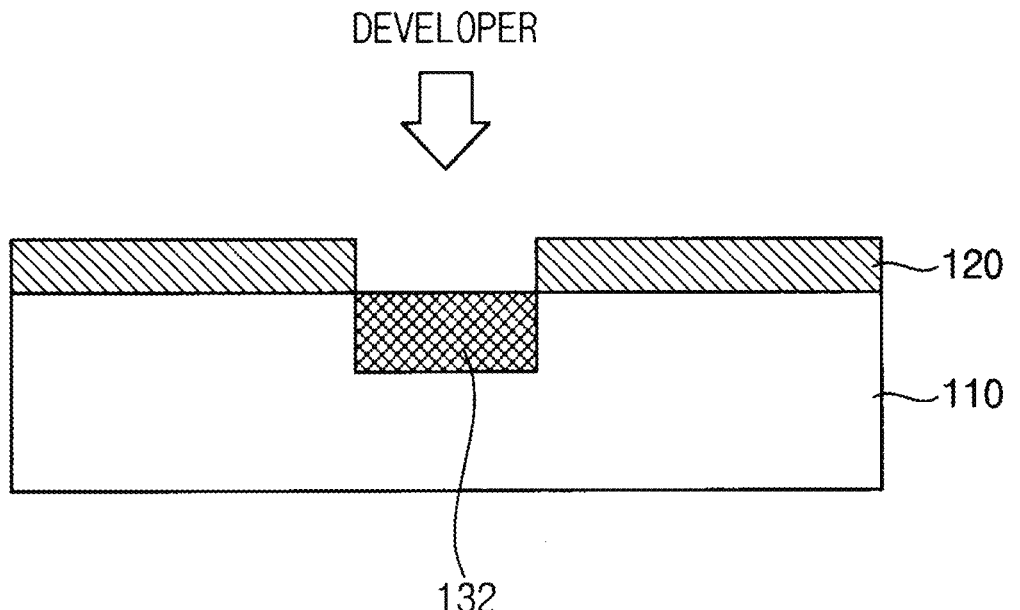

[FIG. 2d]
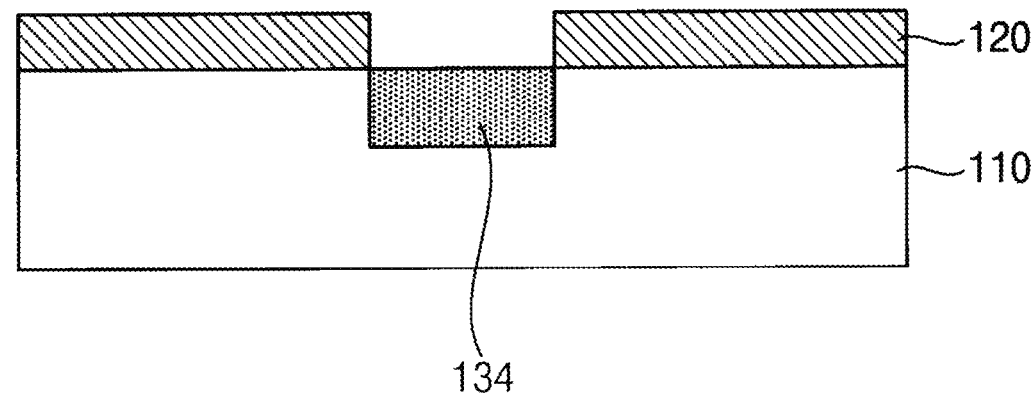
134
[FIG. 2e]
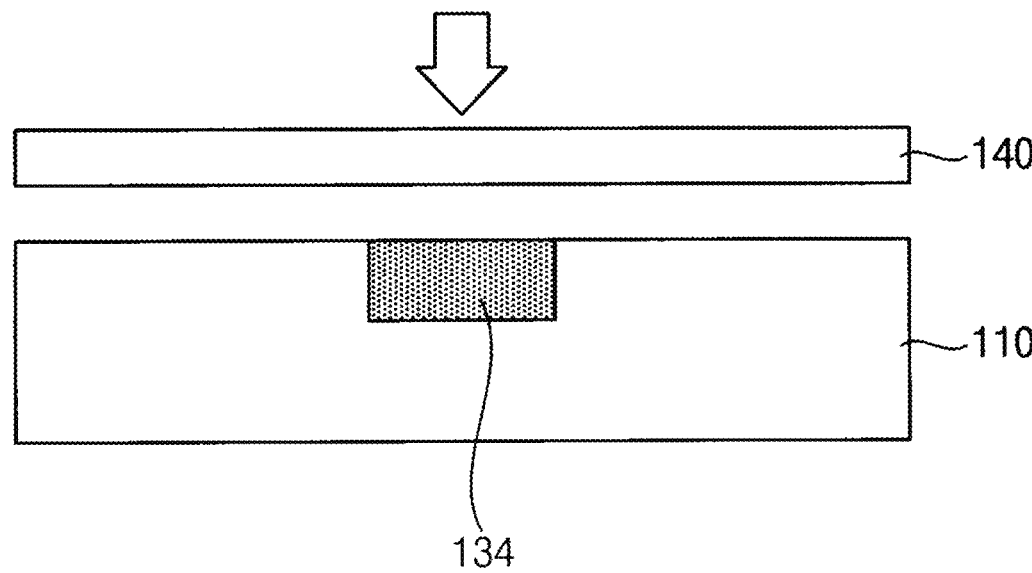
134

[FIG. 2f]
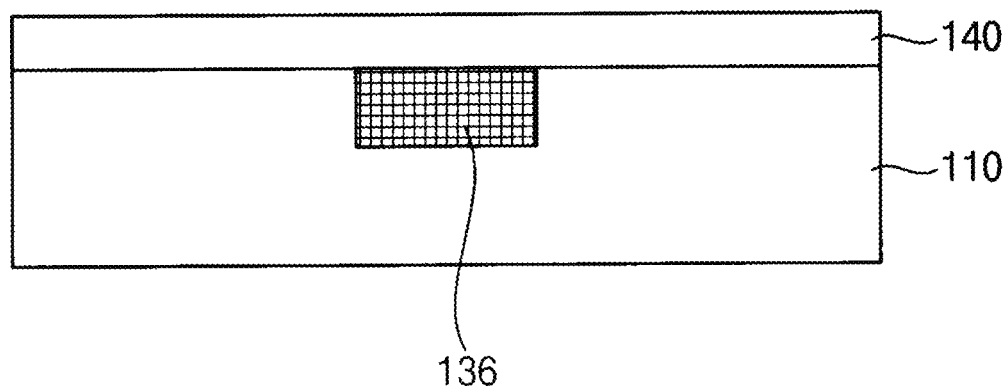
140
110
136
[FIG. 3]
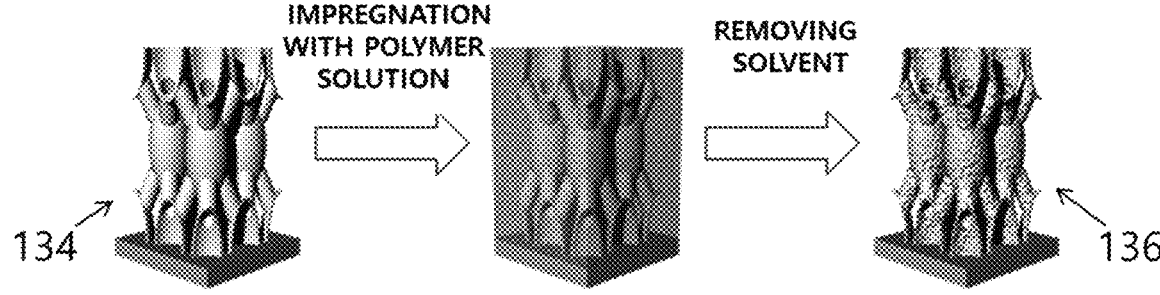
IMPREGNATION
WITH POLYMER
SOLUTION
REMOVING
SOLVENT
134
136

[FIG. 4]
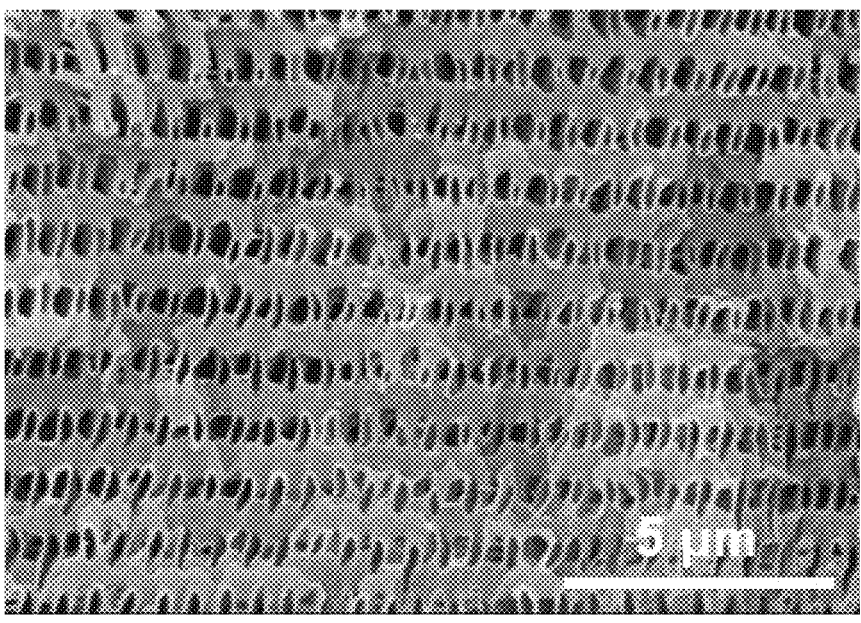
[FIG. 5]
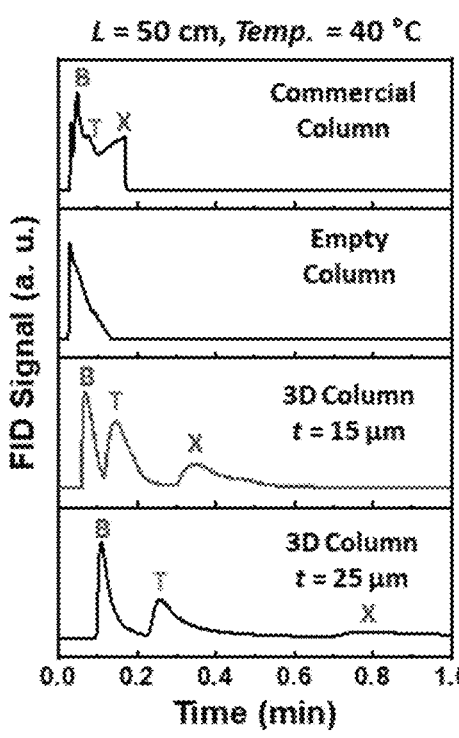
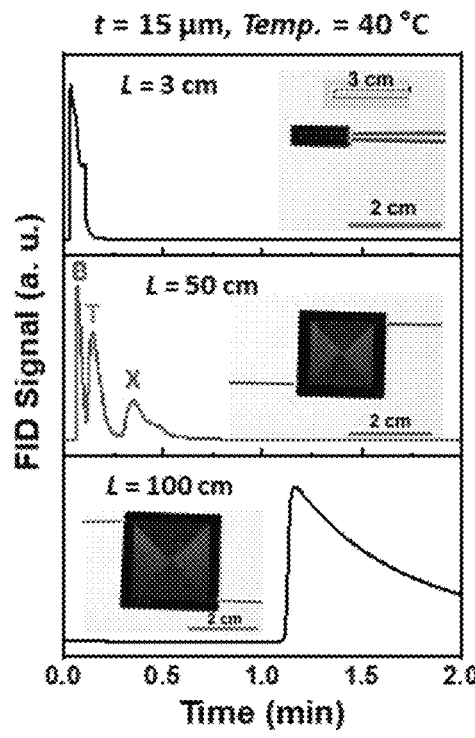

[FIG. 6]
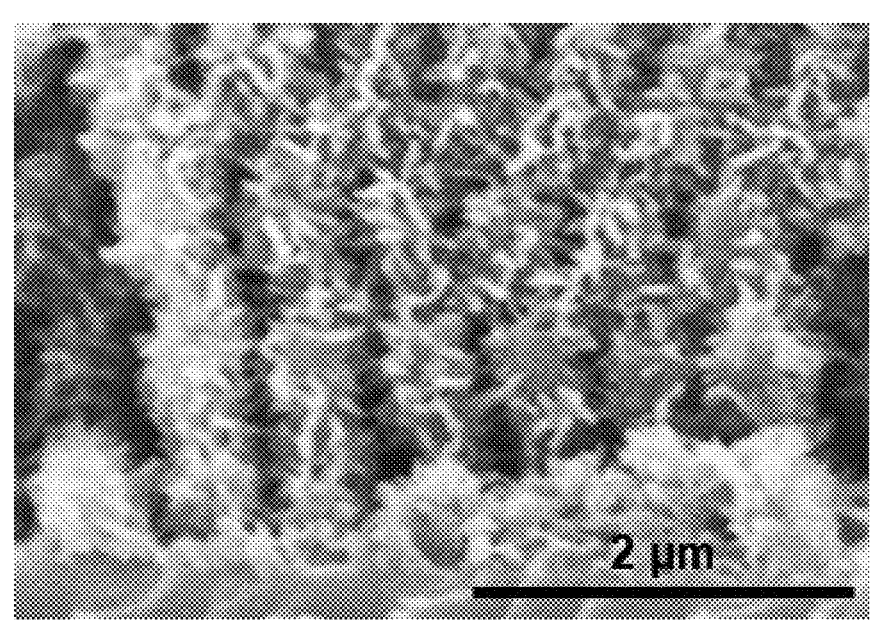

[FIG. 7]
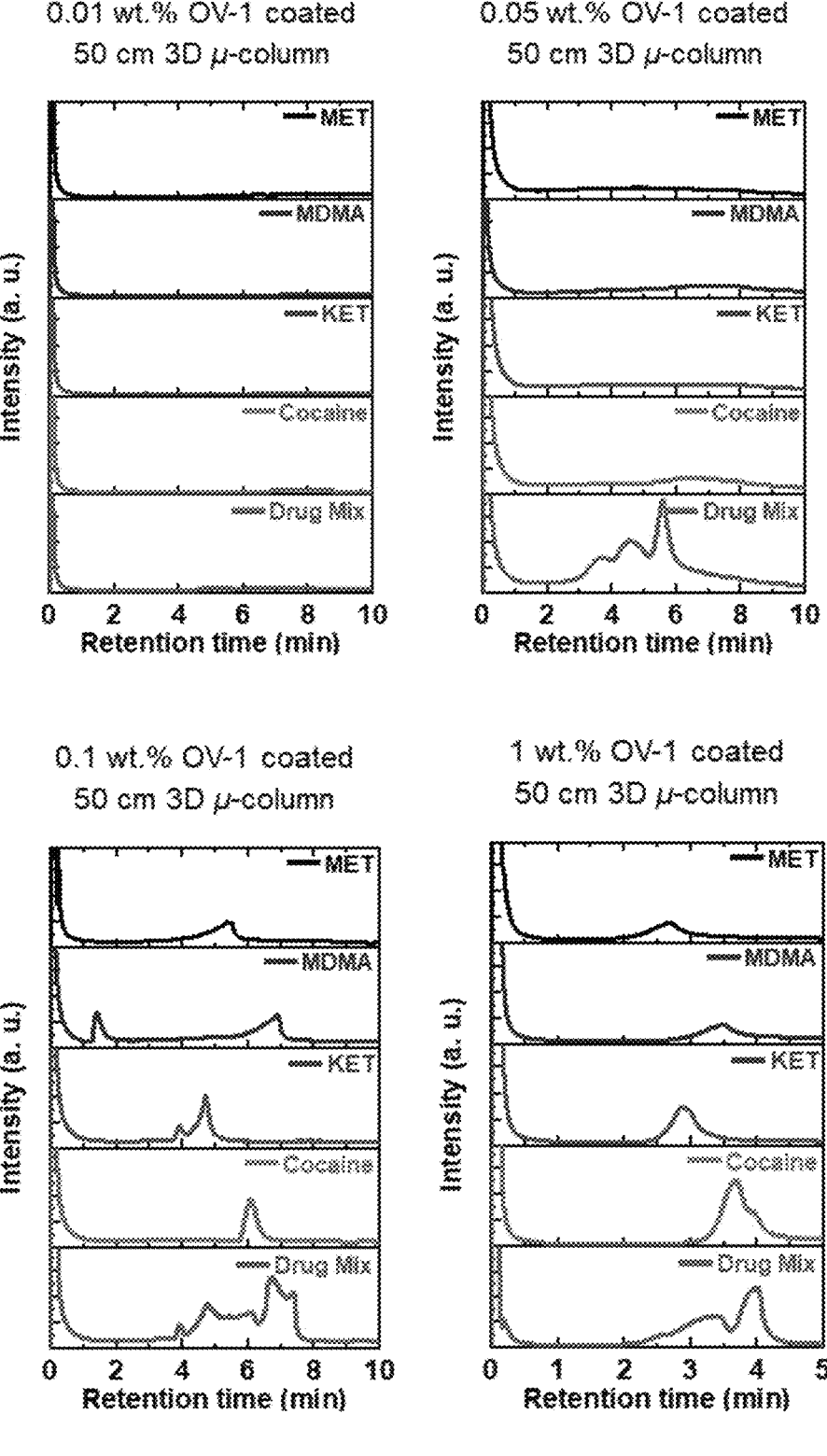

[FIG. 8]
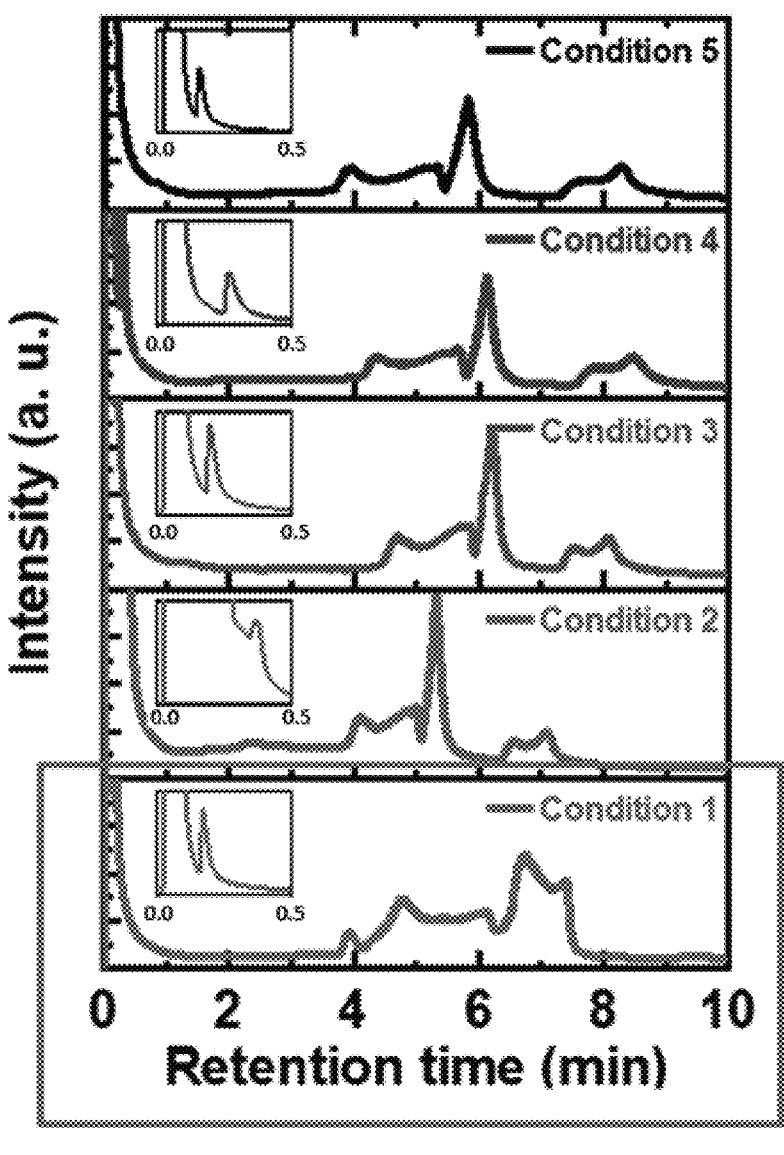

MICRO-SEPARATOR INCLUDING 3D ORDERED NANOSHELL STRUCTURE OF CERAMIC-POLYMER COMPOSITE FOR GAS CHROMATOGRAPHY, METHOD FOR FABRICATING THE SAME AND METHOD FOR SEPARATING GAS MIXTURE USING THE SAME

TECHNICAL FIELD

The invention relates to a micro-separator for gas chromatography. More particularly, the invention relates to a micro-separator including three-dimensionally ordered nano-shell structure of ceramic-polymer composite for gas chromatography, a method for fabricating the same and method for separating gas mixture using the same.

BACKGROUND

Gas chromatography (GC) is an analysis method in which a sample (analyte) is carried by a carrier gas and passes through a material separator column to separate mixed components into a single component. The performance of the material separator column may be an important factor in determining the overall system performance.

A stationary phase is coated in the material separator column. When the carrier gas with the sample passes through the material separator column, chemical equilibrium, adsorption and distribution, which are different depending on components in the sample, appear due to difference in chemical properties between the components and the stationary phase. Thus, a time difference when they pass through the column is caused so that the materials (components) are separated.

In general, as a material separator column, a packed column or a capillary column is used. The packed column consists of an inert material, a solid support, and a coated stationary phase. The packed column may have a relatively large diameter (approximately 2-4 mm of an inner diameter) and a relatively short length (approximately 1.5-10 m), since the packed column has a shape of a tube, of which an inside is entirely filled. The capillary column can be divided into a Wall Coated Open Tubular (WCOT) column coated with a liquid stationary phase, and a Porous Layer Open Tubular (PLOT) column in which a solid porous material having a thin film stationary phase is coated on an inner wall.

Conventional GC systems have advantages of superior reliability and superior separation efficiency compared to other separation systems. However, they have a large volume of $m^3$ level due to a long column of several meters, an oven to maintain a proper temperature of the column, and a signal processing system. Therefore, they have an intrinsic difficulty in being applied for precise analysis of unknown samples collected at industrial scenes. In order to overcome the above problems, studies on u-Gas Chromatography (u-GC) using Microelectromechanical Systems (MEMS) technology have been recently reported. For example, a semi-packed column with a rectangular columnar array within a sputtered open tubular column has been demonstrated to be able to separate short hydrocarbons and natural gas (Non-patent Literature (3)). As another example, it was successful to separate saturated and unsaturated hydrocarbon chains using silica or graphite sputtered micro-columns with metal filaments for temperature programming (Non-patent Literature (4)). In addition, possibility for practical application of micro-GC was suggested by integrating ZIF- 8-PVA cryogel in a laser-etched acrylic micro-separator column to separate a polycyclic aromatic hydrocarbon (Non-patent Literature (5)).

Furthermore, technologies, which increase specific surface area by using three-dimensional nano-structure thereby increasing the number of absorbed and separated molecules in a volume unit and fabricates a separator having a micro-column shape, were suggested for a GC system having a much less size than the conventional GC systems (Non-patent Literature (2), Patent Literature (3))

Patent Literature (1) U.S. Pat. No. 7,704,684
(2) Korean Granted Patent 10-1699454
(3) Korean Granted Patent 10-2183456

Non-Patent Literature (1) Analytical Chemistry, 75, 5525-5531 (2003)
(2) PNAS, 101, 12428-12433 (2004)
(3) Journal of Chromatography A, 1218, 3262-3266 (2011)
(4) Analytical Chemistry, 85, 114-120 (2013)
(5) Talanta, 167, 573-582 (2017)
(6) Analytical Chemistry, 39, 247-259 (2020)

DETAILED DESCRIPTION OF THE INVENTION

Technical Problem to be Solved

One object of the invention is to provide a micro-separator for gas chromatography with separation performance improved by a 3D nano-shell structure of ceramic-polymer composite having a periodic structure.

Another object of the invention is to provide a method for fabricating the micro-separator for gas chromatography.

Another object of the invention is to provide a method for separating gas.

The invention may, however, be embodied in many different forms and should not be construed as limited to the embodiments set forth herein.

Means for Solving Problem

According to embodiments to accomplish the objectives of the present invention, a micro-separator for gas chromatography includes a base substrate having a trench defining a micro-column, and a three-dimensional (3D) porous ceramic-polymer composite disposed in the micro-column and having pores that three-dimensionally connected to each other with periodicity. The 3D porous ceramic-polymer composite includes a ceramic nano-structure, which forms an array of three-dimensionally arranged nano-shells, and a reaction-activating layer combined on a surface of the ceramic nano-structure and including a polymeric reaction-activating material. A thickness of the 3D porous ceramic-polymer composite is 10 μm to 20 μm, a column length of the 3D porous ceramic-polymer composite is 30 cm to 70 cm, and a shell thickness of the ceramic nano-structure is 20 nm to 60 nm.

In an embodiment, the ceramic nano-structure includes oxide, nitride or sulfide of at least one selected from the group consisting of Zn, Al, Ni, Mo, Co, Sn, Fe, W, Ti, Mn, Zr and Cu.

In an embodiment, the polymeric reaction-activating material includes a siloxane-based polymer.

In an embodiment, the reaction-activating layer has a flower-like shape.

In an embodiment, the micro-separator further includes cover substrate combined with the base substrate to cover the micro-column.

A method for fabricating a micro-separator for gas chromatography according to an embodiment includes preparing a base substrate having a trench defining a micro-column and being combined with a sacrificial layer covering an area where the trench is not formed, forming a 3D porous template in the trench, providing a ceramic material in the 3D porous template to form a ceramic nano-structure forming an array of three-dimensionally arranged nano-shells, removing the 3D porous template, removing the sacrificial layer after the 3D porous template is removed, combining a cover substrate with the base substrate, providing a polymer solution including a polymeric reaction-activating material and a solvent in the micro-column of the base substrate, and removing the solvent to form a composite of the ceramic nano-structure and the polymeric reaction-activating material.

A method for separating gas according to an embodiment includes providing a gas mixture in the micro-column of the micro-separator for gas chromatography. The gas mixture includes a drug.

Effects of the Invention

According to the above-explained embodiments of the present invention, a stationary phase of a micro-separator is formed of a ceramic-polymer composite having an ordered 3D nano-structure. Thus, a carrier gas and a sample included therein may efficiently move in the ordered 3D nano-structure, and surface area may be maximized. Thus, performance of a material separator may be improved.

Furthermore, drugs (methamphetamine (MET), ecstasy (3,4-methylenedioxymethamphetamine, MDMA), ketamine (KET), cocaine (benzoylmethylecgonine)), which are hardly detected by conventional separators, may be effectively detected.

Thus, a conventional large-sized separator may be downsized at a level of portable apparatus, and a gas chromatography system, which is applicable at various industrial scenes requiring fast feedback, may be implemented.

BRIEF DESCRIPTION OF THE DRAWINGS

FIGS. 1a, 1b, 1c, 1d and 1e are perspective views illustrating a method for fabricating a micro-separator according to an embodiment.

FIGS. 2a, 2b, 2c, 2d, 2e and 2f are cross-sectional views illustrating a method for fabricating a micro-separator according to an embodiment.

FIG. 3 is a schematic view illustrating processes for forming a ceramic-polymer composite in a method for fabricating a micro-separator according to an embodiment.

FIG. 4 is a scanning electron microscopy (SEM) photograph of the 3D ordered nano-structure ceramic shell obtained according to Example 1.

FIG. 5 are graphs showing results of separating a mixture of volatile organic compounds (benzene, toluene and xylene) through gas chromatography using the 3D nano-structure alumina shell without polymer coating as a stationary phase.

FIG. 6 is an SEM photograph of the 3D nano-structure composite obtained according to Example 1.

FIG. 7 are graphs showing results of separating 4 kinds of drugs (MET, MDMA, KET, COCAINE) through gas chromatography using the composite obtained according to Example 1 depending on contents of a polymer.

FIG. 8 is a graph showing results of separating 4 kinds of drugs (MET, MDMA, KET, COCAINE) through gas chromatography using the composite (the content of OV-1: 0.1 wt %, the column length: 50 cm) obtained according to Example 1 depending on operation conditions.

BEST EMBODIMENT FOR IMPLEMENTING THE INVENTION

A micro-separator for gas chromatography including a three-dimensionally ordered nano-shell structure of a ceramic-polymer composite and a method for fabricating the same according to embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

The terminology used herein is for the purpose of describing particular embodiments only and is not intended to be limiting of the invention. As used herein, the singular forms are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein FIGS. 1a, 1b, 1c, 1d and 1e are perspective views illustrating a method for fabricating a micro-separator according to an embodiment. FIGS. 2a, 2b, 2c, 2d, 2e and 2f are cross-sectional views illustrating a method for fabricating a micro-separator according to an embodiment. FIG. 3 is a schematic view illustrating processes for forming a ceramic-polymer composite in a method for fabricating a micro-separator according to an embodiment. FIGS. 2a to 2f show a cross-section of an area where micro-column is formed.

Referring to FIGS. 1a and 2a, a base substrate 110 having a micro-column (μ-column) 112 is prepared. The micro-column 112 may have a trench shape recessed from an upper surface of the base substrate 110. The micro-column 112 may have a shape bending and extending in a plan view to have a necessary length. For example, a length of the micro-column 112 may be 3 cm to 2 m, however, embodiments are not limited thereto.

The base substrate 110 may include a transparent material. For example, the base substrate 110 may include glass, quartz, silicon, polymer or the like. However, embodiments are not limited thereto. The base substrate 110 may partially or entirely include a conductive material such as a metal.

A sacrificial layer 120 may be disposed on an upper surface of the base substrate 110, where the micro-column 112 is not formed. For example, the sacrificial layer 120 may include a metal such as chromium, aluminum, titanium, copper, gold, silver or the like. The sacrificial layer 120 may be removed in a following process to form a stationary phase having a 3D nano-structure selectively in the micro-column 112 and to prevent residues from remaining on the rest area. Thus, the sacrificial layer 120 may have an opening area corresponding to a shape of the micro-column 112. In another embodiment, the sacrificial layer 120 may include a metal oxide or an organic material. Deep reactive ion etching (DRIE), LIGA (Lithographie Galvano-formung and Abformung) or the like may be used.

For example, the sacrificial layer 120 is formed on a surface of the base substrate 110 through deposition, lamination or the like. Thereafter, portions of the sacrificial layer 120 and the base substrate 110 are removed in an area corresponding to the micro-column 112 to form the micro-column 112. For example, the portions of the sacrificial layer 120 and the base substrate 110 may be removed by wet-etching or dry-etching, which uses a photolithography process, laser or the like. For example, DRIE may be performed.

Referring to FIGS. 1B, 2b and 2c, a 3D porous template (3D polymer) 132 is formed in the micro-column 112.

For example, after a photoresist material is provided in the micro-column 112 by using a syringe, a micro-pipette or the like, soft-baking is performed at about 90° C. to about 100° C. to form a photoresist film 130.

The photoresist material is chemically or physically changed when exposed to electromagnetic radiation. Any photosensitive material, which is turned by absorption electromagnetic radiation to be capable of being chemically etched or not, or to be soluble in a chemical reagent such as a solvent or not, may be used for the photoresist material.

For example, an epoxy-based negative-tone photoresist composition or a DNQ-based positive-tone photoresist composition may be used for the photoresist material. In an embodiment, the photoresist material may include an organic-inorganic hybrid material, hydrogel, a phenolic resin or the like, which can be cross-linked by light exposure.

According to exemplary embodiment, a thickness of the photoresist film 130 may be about 0.1 μm to about 1 mm, and may be preferably 10 μm to 50 μm. However, a thickness of the photoresist film 130 not limited thereto, and may be changed depending on a thickness of a stationary phase to be formed. Furthermore, the photoresist film 130 may preferably have a thickness not larger than a depth of the micro-column so that the photoresist film 130 may not protrude from an upper surface of the base substrate 110.

Referring to FIG. 2b, a three-dimensionally distributed light is provided to the photoresist film 130. In an embodiment, the three-dimensional light-exposure may be performed by proximity-field nano-patterning (PnP) method.

For example, when a phase mask MK, which has a convexo-concave lattice structure formed at a surface thereof and includes a flexible elastomer, is disposed to contact the base substrate 110, the phase mask MK may spontaneously adhere to or conformal-contact a surface of the base substrate 110 by Van der Waals force.

When a laser having a wavelength similar to a periodicity of the lattice of the phase mask MK is irradiated onto the phase mask MK, a three-dimensionally distributed light may be formed by Talbot effect. When the photoresist film is formed from a negative-tone photoresist composition, cross-linking of binders may be selectively caused in a portion where light intensity is relatively high by constructive interference, and may be hardly caused in a remaining portion where light intensity is relative low. Thus, the remaining portion may be removed in a developing process. Thereafter, a drying process may be performed. As a result, a porous polymeric structure having a three-dimensional network shape with a periodicity of hundreds of nanometers to several micrometers may be formed.

For example, the phase mask MK may include a material such as PDMS (polydimetyl siloxane), PUA (polyurethane acrylate), PFPE (perfluoropolyether) or the like.

In an embodiment, the phase mask MK may contact a rear surface of the base substrate 110, and a light source may be disposed under the base substrate 110. When the phase mask MK is disposed above the sacrificial layer 130, a 3D distribution of a light may be changed by a gap between the phase mask MK and the photoresist film 130.

Referring to FIG. 2c, the three-dimensionally light-exposed photoresist film 130 is developed to form a 3D porous template 132.

In an embodiment, when the photoresist film 130 is formed from a negative-tone photoresist composition, a light-exposed portion of the photoresist film 130 may remain while a non-light-exposed portion thereof may be removed. As a result, the 3D porous template 132 including three-dimensional nano-pores may be formed. Examples of a developing solution may include, for example, PGMEA (propylene glycol monomethyl ether acetate).

In an embodiment, the 3D porous template 132 may be formed by a PnP method. However, embodiments are not limited thereto. For example, the 3D porous template 132 may be formed by optical patterning methods such as Interference Lithography, Direct Laser Writing, 2-photon Lithography or the like, or physical deposition methods using Colloidal Self-assembly, block-polymer or the like.

Referring to FIGS. 1c and 2d, after a ceramic material is provided in the 3D porous template 132, the 3D porous template 132 is removed to form a 3D porous ceramic nano-structure (3D metal oxide shell) 134. The 3D porous ceramic nano-structure may have a shape including a plurality of shells that are three-dimensionally arranged.

For example, the ceramic material may be provided by plating methods such as electro-plating, non-electrolyte plating, electrochemical plating, or the like. In an embodiment, the ceramic material may be provided by atomic layer deposition (ALD). However, embodiments are not limited thereto, and various methods cable of filling in a porous structure may be used.

When the 3D porous ceramic nano-structure 134 is formed by ALD, the ceramic material may be changed by changing a precursor. For example, a ceramic material appropriate for separating drugs may include cerium oxide (CeO2), aluminum oxide (Al2O3), titanium oxide (TiO2), zirconium oxide (ZrO2), zinc oxide (ZnO) and titanium nitride (TiN) or a combination thereof.

For example, when the ceramic material includes aluminum oxide, a precursor such as diethyl zinc, $H_2O$, ammonia, tetrakis(dimethylamido)titanium (IV) (TDMAT), trimethyl aluminum (TMA) or the like may be used. For example, the ALD may be repeatedly performed at 40° C. to 100° C. with 100 to 1,000 cycles depending on a desired thickness. For example, a shell thickness of the 3D porous ceramic nano-structure 134 may be 10 nm to 100 nm. Preferably, the shell thickness of the 3D porous ceramic nano-structure 134 may be 20 nm to 60 nm. When the shell thickness of the 3D porous ceramic nano-structure 134 is excessively small, physical strength thereof may be decreased thereby reducing durability. When the shell thickness of the 3D porous ceramic nano-structure 134 is excessively large, porosity thereof may be decreased thereby reducing separation performance However, embodiments are not limited thereto, and the ceramic material may have various compositions depending on separation target. For example, the ceramic material may include oxide, nitride or sulfide of at least one selected from the group consisting of Zn, Al, Ni, Mo, Co, Sn, Fe, W, Ti, Mn, Zr and Cu.

For example, the 3D porous template 132 may be removed by heat treatment, ultrasonic wave treatment using an organic solvent, plasma etching, wet-etching or the like. For example, a temperature in the heat treatment may be elevated by 1 to 5° C./min, and the heat treatment may be performed at 200 to 600° C. for at least 10 minutes to remove the 3D porous template 132. When a speed for elevating the temperature is excessively large, the 3D porous template 132 may be deformed thereby causing damage to the 3D porous ceramic nano-structure 134.

In an embodiment, a thickness (film thickness) of the 3D porous ceramic nano-structure 134 may be 10 μm to 30 μm preferably 10 μm to 20 μm. When the thickness of the 3D porous ceramic nano-structure 134 is excessively small, a reaction area may be decreased thereby reducing separation performance. When the thickness of the 3D porous ceramic nano-structure 134 is excessively large, it may be difficult to for uniform a 3D structure.

In an embodiment, a length, by which a sample passes through the micro-column, of the 3D porous ceramic nano-structure 134 may be 10 cm to 90 cm, preferably 30 cm to 70 cm. When the length of the 3D porous ceramic nano-structure 134 is excessively large or small, separation performance thereof may be reduced.

Referring to FIGS. 1*d* and 2*e*, the sacrificial layer 120 on the upper surface of the base substrate 110 is removed. A cover substrate 140 is combined with the base substrate 110 to cover the 3D porous ceramic nano-structure 134. As the sacrificial layer 120 is removed, residues, for example, a ceramic deposition layer, remaining on an area besides the micro-column may be removed.

The sacrificial layer 120 may be removed by etchants properly selected depending on a material thereof.

The cover substrate 140 may include silicon, glass, quartz, a polymer or the like. In an embodiment, the cover substrate 140 may include silicon, and may be bonded to the base substrate 110 by anodic bonding. However, embodiments are not limited thereto. For Example, the cover substrate 140 and the base substrate 110 may be combined by known bonding methods such as crystal bonding, melting, an adhesive or the like.

Referring to FIG. 1*e*, a guard column may be coupled to both ends of the micro-column of the base substrate 110 combined with the cover substrate. In following processes, a polymer solution may be provided in the micro-column of the base substrate 110 through the guard column.

Referring to FIGS. 2*f* and 3, after the polymer solution is provided in the micro-column of the base substrate 110, a solvent is removed. As a result, a polymeric material is coated on a surface of the 3D porous ceramic nano-structure 134 thereby forming a 3D porous ceramic-polymer composite 136 including a reaction-activating layer. The 3D porous ceramic-polymer composite 136 may have a shape of nano-shell array.

For example, the polymer solution may be provided in the micro-column of the base substrate 110 through the guard column illustrated in FIG. 1. However, embodiments are not limited thereto, and the polymer solution may be directly provided without the guard column.

In an embodiment, the polymer solution may include a siloxane-based polymer.

The polymer may function as a reaction-activating material for a target material depending on a functional group thereof. For example, the siloxane-based polymer may be used as a reaction-activating material for drugs (cocaine, heroin, morphine, methamphetamine, ecstasy, ketamine, etc.) containing a functional group of an H-bond acceptor.

In an embodiment, the siloxane-based polymer may include polydimethylsiloxane (PDMS), polymethylphenylsiloxane, polymethylphenylcyanopropylsiloxane or a combination thereof. Particularly, the siloxane-based polymer may include OV-1 (100% dimethylpolysiloxane gum, polydimethylsiloxane, or polymethylsiloxane), OV-17 (50% Phenyl-50% methylpolysiloxane), OV-25 (75% Phenyl-25% methylpolysiloxane), OV-225 (25% Phenyl-25% cyanopropyl-50% methylsilicone or p/p poli (cyano-propyl) (methyl)(phenyl)(methyl) siloxane), which are provided by Sigma Aldrich, or the like.

The siloxane-based polymer may be used as a reaction-activating material for detecting drugs/alkaloids/phenols/steroids or for detecting neutral sugars/amino sugars, depending on a polarity thereof.

However, embodiments are not limited thereto, and other reaction-activating materials may be used for detecting drugs or other materials than drugs. For example, various materials including polyethylene glycol as represented by the following Table.

TABLE 1

| Sigma Aldrich | Components | polarity | target |
|---|---|---|---|
| OV-5 | 5% diphenyl, 95% dimethylpolysiloxane | non-polar | alkaloids, aromatics, drugs of abuse, fatty acid methyl esters, herbicides, hydrocarbons, halogenated compounds, and pesticides |
| OV-17 | 50% diphenyl, 50% Dimethylpolysiloxane | mid-polar | herbicides, steroids, and drug screening |
| OV-20 | 20% diphenyl, 80% dimethylpolysiloxane | low to mid polar | alcoholic beverages, flavor aromatics, volatile compounds |
| OV-35 | 35% diphenyl, 65% dimethylpolysiloxane | mid-polar | aroclors, pesticides, and pharmaceuticals |
| OV-351 | nitroterephthalicacid modified PEG | high-polar | underivatized free fatty acids |
| OV-624 | Priority Pollutants Phase | — | EPA Method 502.2 Volatile Organics |

TABLE 1-continued

| Sigma Aldrich | Components | polarity | target |
|---|---|---|---|
| OV-1301 | 6% cyanopropylphenylmethylpolysiloxane | low to mid polar | volatile organics, pharmaceutical samples, alcohols, oxygenates, pesticides, aroclors, and PCBs |
| OV-1701 | 14% cyanopropylphenylmethylpolysiloxane | — | pharmaceutical samples, alcohols, oxygenates, pesticides, aroclors, PCBs and solvents |
| Carbowax20M | polyethylene glycol (PEG) | high-polar | alcohols, aromatics, essential oils, glycols, and polar solvents |

A solvent for the polymer solution may include various organic solvents such as acetone, ethanol, chloroform, toluene or the like, or may include water depending on a polymer.

The solvent may be removed by using known various methods. For example, the substrate may be heated to remove the solvent.

In an embodiment, the 3D porous ceramic nano-structure 134 may be dipped in the polymer solution at a room temperature for at least 10 minutes. Thereafter, the substrate may be heated, for example, at 120° C. to 150° C. for 0.5 to 3 hours without gas injection to remove the solvent of the polymer solution. As a result, a reaction-activating layer having a flower-like shape (or dendrite shape) may be obtained. Such reaction-activating layer having a flower-like shape may have larger surface area thereby improving separation performance.

For example, a content of the siloxane-based polymer may be 0.01 wt % to 10 wt %, preferably 0.05 wt % to 1 wt %, and more preferably 0.07 wt % to 0.3 wt %. When the content of the polymer is excessively small, a reaction-activating layer may not be sufficiently formed, or a flower-like shape may not be formed, thereby reducing separation performance. When the content of the polymer is large, a flower-like shape may not be formed, or porosity may be decreased.

However, embodiments are not limited thereto, and a proper content of a polymer may be varied depending on a polymer.

The micro-separator may be used for separating drugs. In order to maximize the performance of the micro-separator, an initial temperature may be 50° C. to 70° C., an elevation speed may be 25° C./min to 35° C./min, and a final temperature may be 240° C. to 280° C., in a separation process.

A micro-separator according to an embodiment includes a stationary phase consisting of a 3D porous ceramic-polymer composite having a nano-shell array shape. The stationary phase may have a large activation area, superior separation characteristics and superior electrical characteristics. Furthermore, the stationary phase may have superior mechanical characteristics due to a ceramic nano-shell structure thereby increasing durability.

Furthermore, the stationary phase includes a polymer forming a reaction-activating layer thereby improving separation performance for drugs.

Furthermore, a sacrificial layer is formed on an area where a micro-column is not formed, and the sacrificial layer is removed after a ceramic nano-structure is formed. A polymer is coated on a nano-structure in the micro-column after a cover substrate and a trench substrate are combined with each other. Thus, the stationary phase may be formed selectively in the micro-column with high precision. Furthermore, residues may be prevented from weakening bonding between the substrates or from reducing separation performance.

Hereinafter, a 3D porous ceramic-polymer composite and a method for fabricating the same according to embodiments will be explained with reference to particular examples and experiments. However, the examples and the experiments are exemplarily provided, and the invention should not be construed as limited to the examples and experiments.

Example 1

1. Fabricating 3D Ordered Porous Template by Using PnP Method.

A micro-column channel having a trench shape (depth: 360 μm, width: 350 μm) was formed at a glass substrate, on which a sacrificial layer (Au/Cr) was deposited, by using deep reactive ion etching. After a photoresist composition (trade name: SU-8 10, MicroChem) was provided in the micro-column channel by using a syringe, the substrate was heated on a hot plate at 65° C. for 1 hour and at 95° C. for 24 hours to form a photoresist film.

A phase mask formed of PDMS and having a periodic convexo-concave structure (periodicity: 600 nm, height of protrusion: 420 nm) was disposed to contact a rear surface the glass substrate. An Nd:YAG laser having a wavelength of 365 nm was irradiated to the photoresist film through the phase mask, a 3D light distribution having a periodicity along x axis, y axis and z axis was projected to the photoresist film. Thereafter, a bonding force was generated in the photoresist film through heat activation (post-baking), and an etching solution (trade name: SU-8 Developer, MicroChem) was provided to partially remove the photoresist film thereby forming a porous template of 3D nano-structure.

2. Filling Ceramic (Alumina) by Using Atomic Layer Deposition

An atomic layer deposition (ALD) process was performed to provide a precursor (trimethylaluminum, TMA) and a reactant ($H_2O$, DI water) in the porous template thereby depositing alumina ($Al_2O_3$) on a surface of the porous template. 1 cycle in the ALD process consisted of 0.5 second for the precursor, 30 seconds for Ar, 1 second for the reactant and 30 seconds for Ar, and 370 cycles were repeated to form an alumina shell having a thickness of 40 nm (deposition speed: 0.11 nm/cycle).

3. Fabricating 3D Ordered Nano-Structure Ceramic Shell Through Heat Treatment

The porous template with alumina deposited thereon was heat-treated in a tube furnace to remove the porous template. The temperature was elevated by 2° C./min, and then kept at 350° C. for 5 hours. Thereafter, the temperature was elevated by 1° C./min, and then kept at 500° C. for 2 hours.

FIG. 4 is a scanning electron microscopy (SEM) photograph of the 3D ordered nano-structure ceramic shell obtained according to Example 1. Referring to FIG. 4, the 3D ordered nano-structure ceramic shell was well formed in the micro-column channel without structural collapse.

4. Bonding Cover to the Substrate Having the 3D Nano-Structure

After the sacrificial layer was removed by using an etching solution (CE-905N, Transene), a cover formed of silicon was disposed on the glass substrate with the 3D nano-structure alumina shell formed in the micro-column channel. An anodic bonding process was performed at a high temperature with a high voltage.

FIG. 5 are graphs showing results of separating a mixture of volatile organic compounds (benzene, toluene and xylene) through gas chromatography using the 3D nano-structure alumina shell without polymer coating as a stationary phase.

In FIG. 5, t represents a thickness of the 3D nano-structure alumina shell, L represents a length of the 3D nano-structure alumina shell (length of a trench). A commercial column (HP-1, Agilent) and an empty trench (Empty column) were used for comparative examples.

Referring to FIG. 5, when the 3D nano-structure alumina shell had a thickness of 15 μm and a column length of 50 cm, benzene (B), toluene (T) and xylene (X) were distinctly separated.

5. Impregnation with Polymeric Material and Fabricating Composite

A chloroform solution containing a polymeric material (OV-1, Sigma Aldrich) was injected into the micro-column channel having the 3D nano-structure alumina shell therein by using a syringe. After being kept at a room temperature for 30 minutes, the substrate was heated on a hot plate at 140° C. for 1 hour to evaporate a solvent thereby forming a composite in which the polymeric material was coated on a surface of the 3D nano-structure alumina shell.

FIG. 6 is an SEM photograph of the 3D nano-structure composite obtained according to Example 1. Referring to FIG. 6, a shape of the composite was maintained well without collapse after the polymeric material was coated. Furthermore, a reaction-activating layer having a dendrite shape was formed well on a surface thereof.

FIG. 7 are graphs showing results of separating 4 kinds of drugs (MET, MDMA, KET, COCAINE) through gas chromatography using the composite obtained according to Example 1 depending on contents of a polymer. In FIG. 7, MET represents methamphetamine, MDMA represents ecstasy, KET represents ketamine, and COCAINE represents cocaine.

Referring to FIG. 7, when the content of the polymer was 0.1 wt %, the separation performance was most superior.

In order to experiment separation performance depending on operation condition, the separator (coated with OV-1) of Example 1 was coupled to a commercial GC (Agilent 880b) through a guard column. Thereafter, experiments were performed with a carrier gas (1 mL/min), injection volume of 1 μl, split ratio of 40:1 and drug contents of 2,000 ppm (in methanol) under the conditions represented by the following Table 2.

TABLE 2

| | Initial temperature (° C.) | Elevation speed (° C./min) | Final temperature (° C.) |
|---|---|---|---|
| Condition 1 | 60 | 30 | 260 |
| Condition 2 | 30 | 60 | 150 |
| Condition 3 | 40 | 30 | 220 |
| Condition 4 | 40 | 40 | 150 |
| Condition 5 | 40 | 40 | 150 |

FIG. 8 is a graph showing results of separating 4 kinds of drugs (MET, MDMA, KET, COCAINE) through gas chromatography using the composite (the content of OV-1: 0.1 wt %, the column length: 50 cm) obtained according to Example 1 depending on operation conditions.

Referring to FIG. 8, the separation performance of the separator of Example 1 was most superior at the initial temperature of 60° C., the elevation speed of 30° C./min, and the final temperature of 260° C.

The foregoing is illustrative of embodiments and is not to be construed as limiting thereof. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

ABILITY OF INDUSTRIAL UTILITY

A micro-separator fog gas chromatography according to embodiments may be used for detecting various harmful materials including drugs.

What is claimed is:

1. A method for fabricating a micro-separator for gas chromatography, the method comprising:
preparing a base substrate having a trench defining a micro-column and being combined with a sacrificial layer covering an area where the trench is not formed;
forming a 3D porous template in the trench;
providing a ceramic material in the 3D porous template to form a ceramic nano-structure forming an array of three-dimensionally arranged nano-shells;
removing the 3D porous template;
removing the sacrificial layer after the 3D porous template is removed;
combining a cover substrate with the base substrate;
providing a polymer solution including a polymeric reaction-activating material and a solvent in the micro-column of the base substrate; and
removing the solvent to form a composite of the ceramic nano-structure and the polymeric reaction-activating material.

2. The method for fabricating a micro-separator for gas chromatography of claim 1, wherein the ceramic nano-structure includes oxide, nitride or sulfide of at least one selected from the group consisting of Zn, Al, Ni, Mo, Co, Sn, Fe, W, Ti, Mn, Zr and Cu.

3. The method for fabricating a micro-separator for gas chromatography of claim 2, wherein the ceramic nano-structure is formed through atomic layer deposition.

4. The method for fabricating a micro-separator for gas chromatography of claim 1, wherein the polymeric reaction-activating material includes a siloxane-based polymer.

5. The method for manufacturing a micro-separator for gas chromatography of claim 4, wherein the siloxane-based polymer includes at least one selected from the group consisting of polydimethylsiloxane (PDMS), polymethylphenylsiloxane and polymethylphenylcyanopropylsiloxane.

6. The method for manufacturing a micro-separator for gas chromatography of claim 4, wherein a content of the siloxane-based polymer in the polymer solution is 0.05 wt % to 1 wt %.

7. The method for manufacturing a micro-separator for gas chromatography of claim 1, wherein the sacrificial layer includes a metal.

8. The method for manufacturing a micro-separator for gas chromatography of claim 1, wherein preparing the base substrate combined with the sacrificial layer comprises:

forming the sacrificial layer on an upper surface of the base substrate; and partially removing the sacrificial layer and the base layer to form the trench.

9. The method for manufacturing a micro-separator for gas chromatography of claim 1, wherein forming the 3D porous template in the trench comprises:

forming a photoresist film in the trench;

disposing a phase mask on a rear surface of the base substrate, which is spaced apart from the trench;

irradiating a light onto the photoresist film through the phase mask; and developing the light-exposed photoresist film.

10. The method for manufacturing a micro-separator for gas chromatography of claim 1, wherein a thickness of the composite is 10 μm to 20 μm, a column length of the composite is 30 cm to 70 cm, and a shell thickness of the ceramic nano-structure is 20 nm to 60 nm.

\* \* \* \* \*